United States Patent [19]
Karlsen

[11] Patent Number: 5,211,686
[45] Date of Patent: May 18, 1993

[54] VALVE DEVICE

[76] Inventor: Odd D. Karlsen, Bøgata 15B, N-6008 Ålesund, Norway

[21] Appl. No.: 778,929
[22] PCT Filed: Feb. 15, 1991
[86] PCT No.: PCT/NO91/00021
   § 371 Date: Dec. 16, 1991
   § 102(e) Date: Dec. 16, 1991
[87] PCT Pub. No.: WO91/12448
   PCT Pub. Date: Aug. 22, 1991

[30] Foreign Application Priority Data

Feb. 16, 1990 [NO] Norway .................................. 900754

[51] Int. Cl.$^5$ .............................................. F16K 3/30
[52] U.S. Cl. .................................. 137/316; 137/454.6; 251/329
[58] Field of Search ...................... 137/315, 316, 454.6; 251/329

[56] References Cited

U.S. PATENT DOCUMENTS

| | | | |
|---|---|---|---|
| 3,114,386 | 12/1963 | Dumm | 137/316 |
| 3,658,087 | 4/1972 | Nelson | 137/454.6 |
| 4,390,039 | 6/1983 | Johnson et al. | 137/315 |
| 4,431,022 | 2/1984 | Ripert | 137/315 |
| 4,641,681 | 2/1987 | Ikematsu et al. | 137/315 |
| 4,718,444 | 1/1988 | Boelte | 137/315 X |
| 4,953,587 | 9/1990 | Steele | 137/315 |

Primary Examiner—Stephen M. Hepperle
Attorney, Agent, or Firm—Bacon & Thomas

[57] ABSTRACT

A valve device comprising a valve housing having inlet and outlet end pieces for mounting of the valve in a pipeline, and a valve member being moveable for opening and closing of the valve. The valve member is mounted in a unit which can be removed from the valve housing and which consists of a cover that can be sealingly fastened to the valve housing in which cover is mounted a rod or spindle for movement of the valve member, a retainer in which the valve member is moveable and which carries gaskets for sealing against seats in the valve housing, respectively, and the valve housing has a transverse opening and is equipped with an arrangement for locking the cover in its mounted position, in order to permit rectilinear movement of the unit into and out of the transverse opening. The gaskets can be mutually shifted axially in the retainer whereby springs are provided for urging the gaskets axially towards the seats in order to cause sealing in the assembled state, and the retainer comprises assemblies for locking the gaskets in an axially retracted position in the retainer.

9 Claims, 8 Drawing Sheets

VALVE DEVICE

BACKGROUND OF THE INVENTION

The present invention relates to a valve device for underwater applications, in particular adapted for water injection and/or oil/gas production manifolds and pipeline systems but also suited for land based/platform based applications.

Generally for valve systems and in particular in underwater pipeline systems, it is of importance that the equipment operates with as large regularity as possible and that damage can be repaired and replacements can be performed rapidly and safely during inspection and maintenance.

In order to achieve this the valve system must be designed in such a manner that those parts which according to experience need maintenance, repair or replacement are reasonably easily accessible.

Valves used today in underwater production and injection systems entail several problems. Here might be mentioned ingress of particles from main flow conduits to the space inside valve housings, which can damage sealing surfaces and/or prevent movement of the valve member. Difficult and time consuming repair must be carried out, and often complete valves must be raised for maintenance and the valve housing must be dismantled from the pipeline.

Thus, there is a need of a valve design which is particularly adapted for rapid and safe underwater assembly.

SUMMARY OF THE INVENTION

The invention permits that all elements which relate to the functioning of the valve can be assembled in and dismantled from the valve housing as a unit, and in such a way that the sealing rings adapted to seal against the valve housing are protected during assembly.

BRIEF DESCRIPTION OF THE DRAWINGS

The invention will hereinafter be explained more detailed, with reference to the accompanying drawings, which show non-limiting examples of embodiments of the invention.

DETAILED DESCRIPTION OF THE PREFERRED EMBODIMENTS

Figure 1:
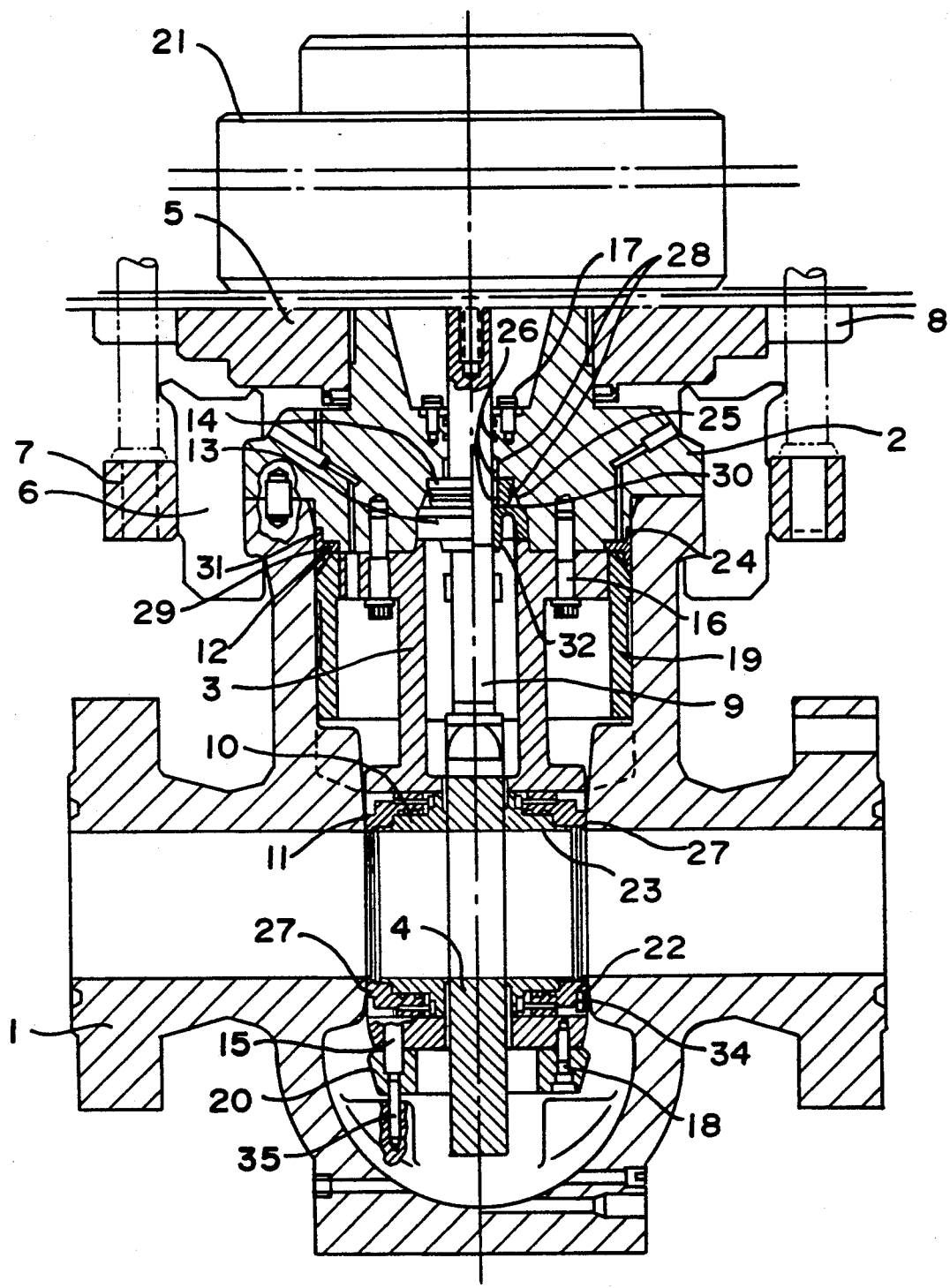
FIG. 1 shows a device according to the invention, shown in an axial section through the valve a passage, in an application in a gate valve.

FIG. 1 shows an actuator 21 mounted at the top of a cover 2.

A retainer 3 is fastened to the valve cover 2 by means of bolts 16 and carries a valve member 4 having gaskets 10 and 11. Locking claws 6 lock the valve cover 2 against the valve housing 1. A ring 7 keeps the locking claws 6 in their locking position. Here, the valve member is a gate sluice.

Figure 2:
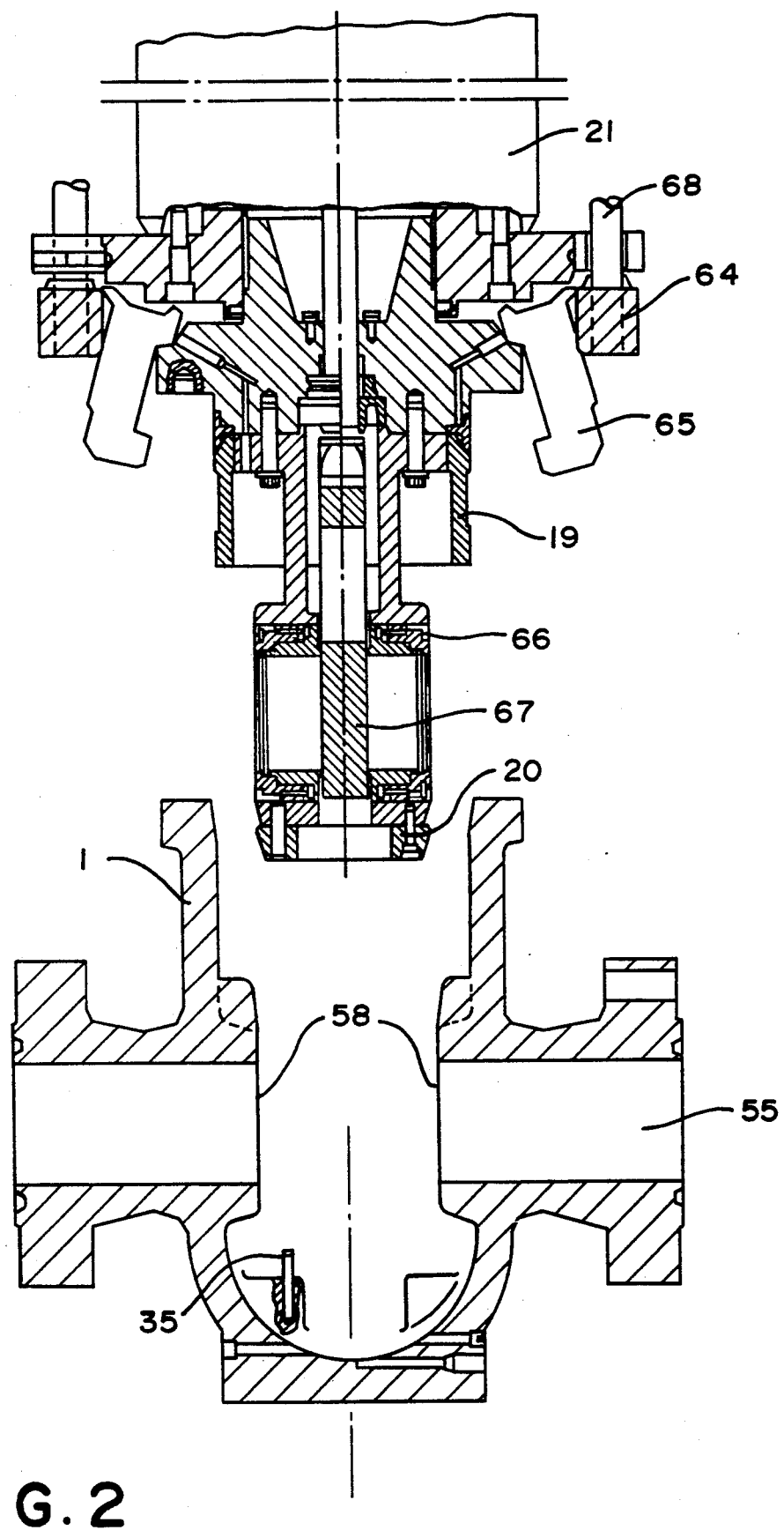
FIG. 2 shows the unit removed from the valve housing, seen in the same section as in FIG. 1.

FIG. 2 shows a unit ready for assembly in a valve housing 1. The insertion unit depends from a not shown tool, by means of rods 68 which keep the ring 7 in its uppermost position. Due to the structural features of the locking claws they are brought to a gripping position as shown in the Fig.

The retainer 3 is equipped with a guide 20 which also acts as an end protection element. A bolster 19 secures adequate entry in the valve housing and at the same time it acts as guidance and protects the metallic gaskets of the valve cover.

FIG. 2 further shows the valve housing 1 and its planar, parallel sealing surfaces (seats) 58.

During assembly, as shown in FIG. 2, the outermost sealing rings 11 at each side of the valve member 4 are locked in an inner position 66. The distance between the sealing surfaces of the outermost gaskets 11 is less than the distance between the valve seats 58 in the valve housing. Thereby rubbing between the sealing surfaces and the valve seats is avoided during assembly and the danger of causing scratches and damage on the sealing surface is like wise avoided.

Figure 3:
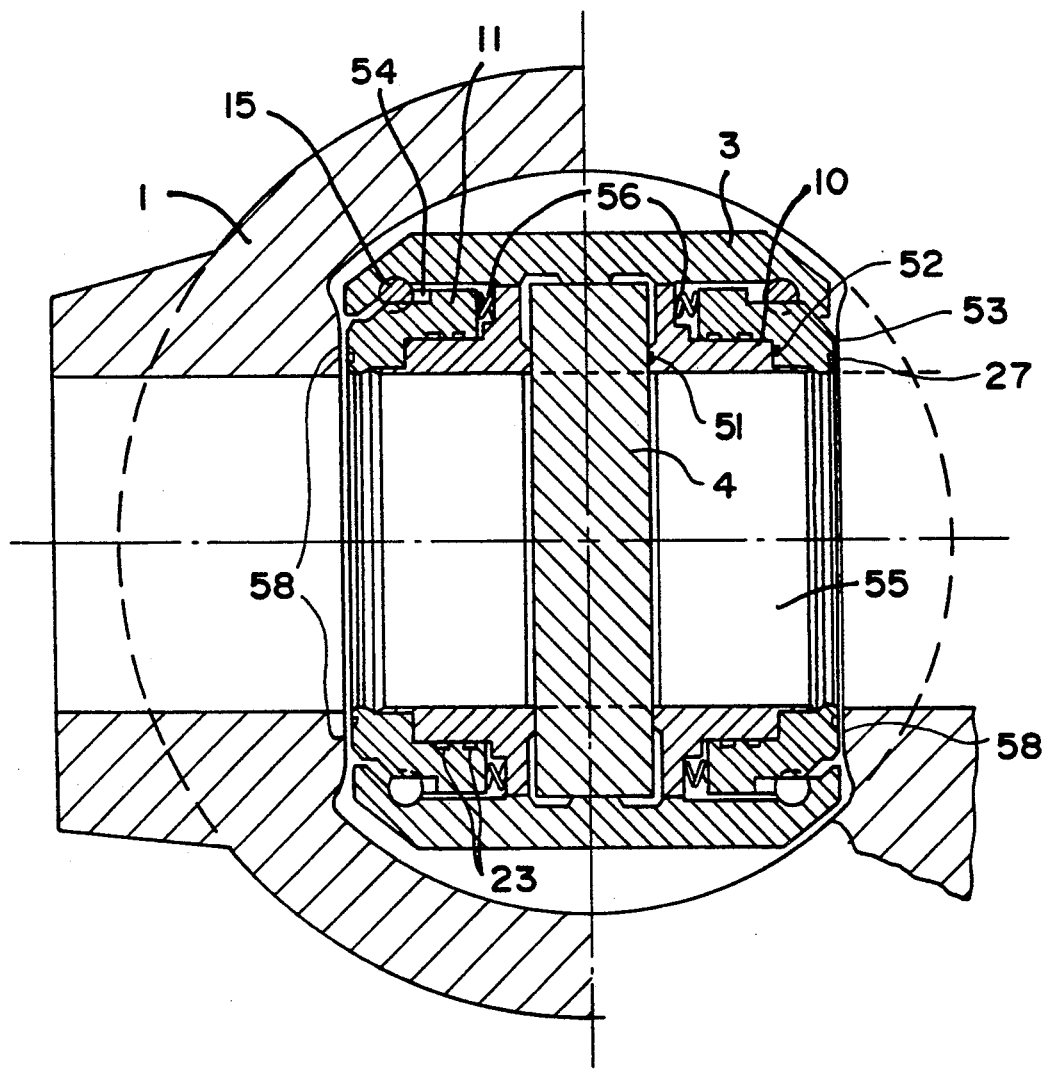
FIG. 3 shows in a larger scale a section perpendicular to the section of FIGS. 1 and 2, axially through a portion of the passage.

FIG. 3 shows the sealing arrangement comprising the sealing rings 10 and 11. Springs 56 bias the rings apart and cause that the sealing surfaces are urged against each other with a certain force during operation. FIG. 3 shows the gasket rings in a compressed and locked position immediately prior to the complete entry of the entire insertion unit in the valve housing 1.

An elastomer sealing ring 27 merely constitutes an auxiliary sealing ring which is active during the initial pressure rise. The main sealing is based on metallic, planar surfaces on the gaskets 11.

Figure 4:
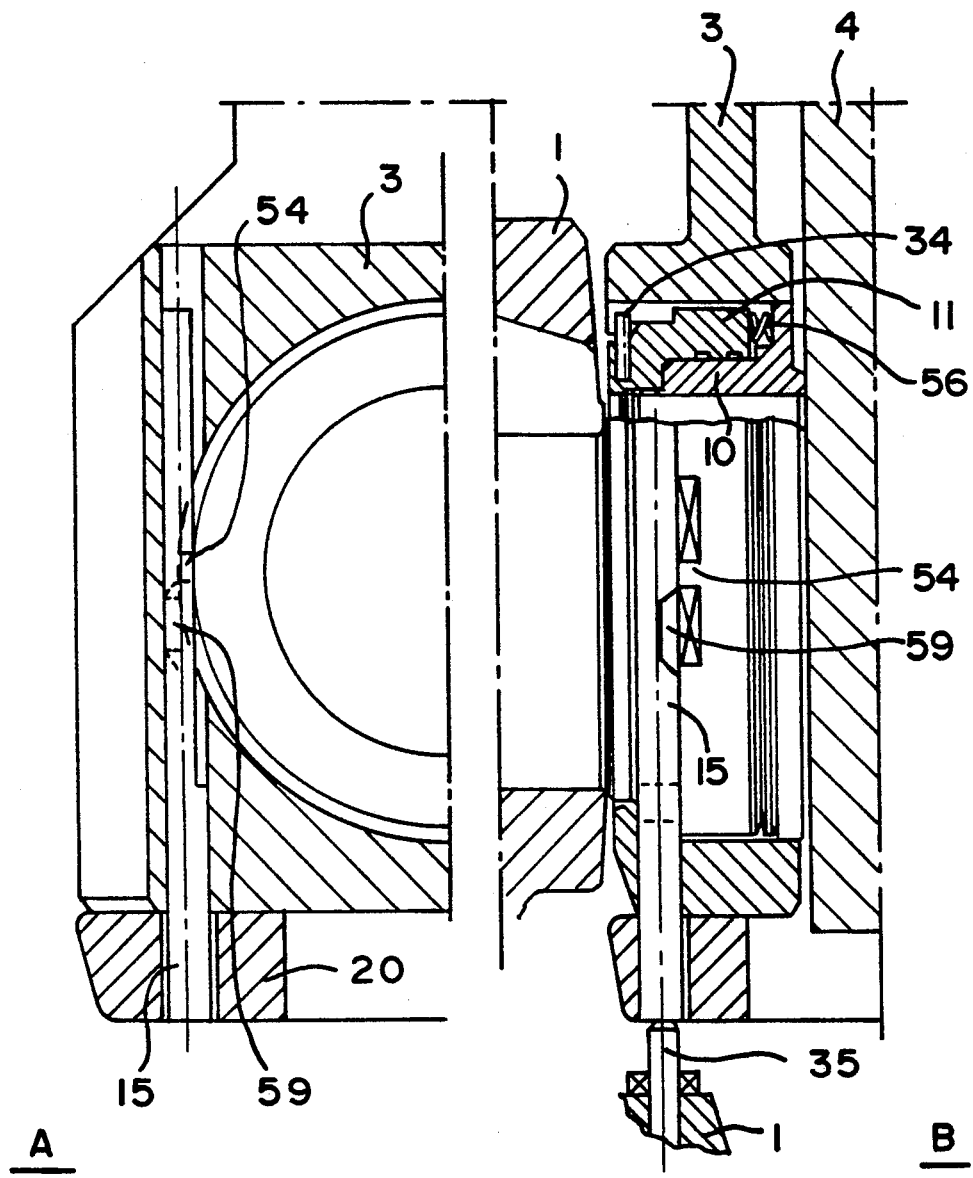
FIG. 4A shows a section transversely of the passage, and illustrates one half of a portion of the retainer.
FIG. 4B shows the same portion of the retainer as FIG. 4B, seen in an axial section.

The locking of the gaskets 11 during the assembly of the unit is shown in FIGS. 4A and 4B. As it appears, the locking is effected by means of locking rods 15 on both sides of the gaskets 11. A locking knob 54 on the ring 11 engages each locking rod 15 during assembly of the unit in the valve housing 1.

Figure 5:
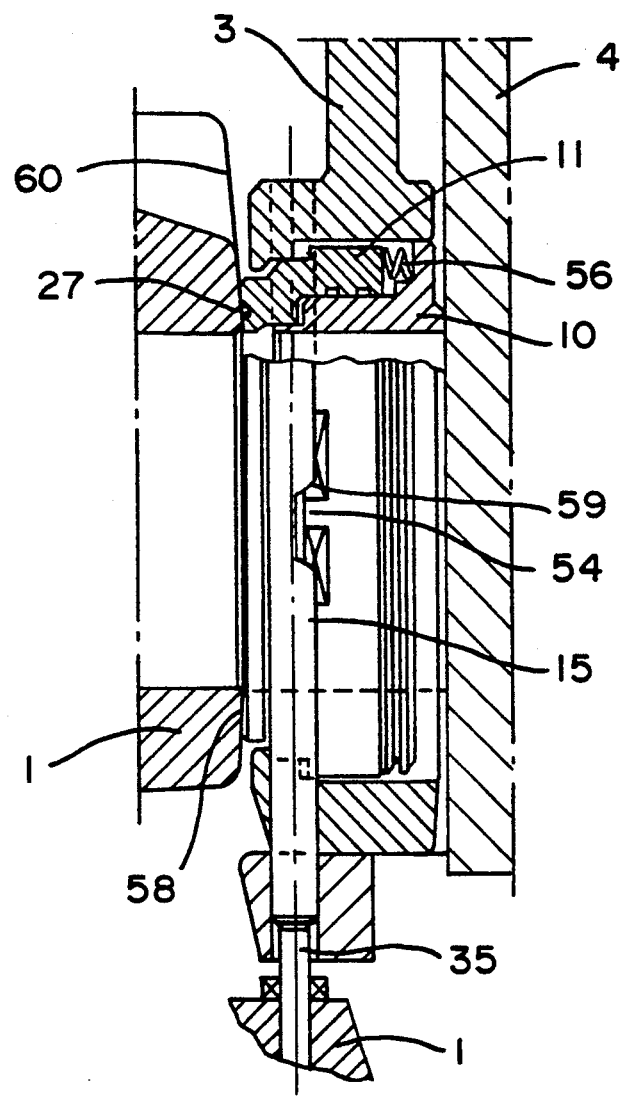
FIG. 5 shows a section corresponding to that of FIG. 4B, and illustrates how the locking of a gasket is released during assembly of the unit in the valve housing.

Immediately prior to the complete entry of the insertion unit in the valve housing (FIG. 2) protrusions 35 in the valve housing will shift the locking rods 15 (during the last movement of the insertion unit to its correct position). This shifting will cause that the locking ceases, in that the ring 11 by means of the force from the spring 56 will be biased outwardly towards the sealing surface 58 in the valve housing, as shown in FIG. 5, and the locking knob 54 is forced into a recess 59.

Figure 6:
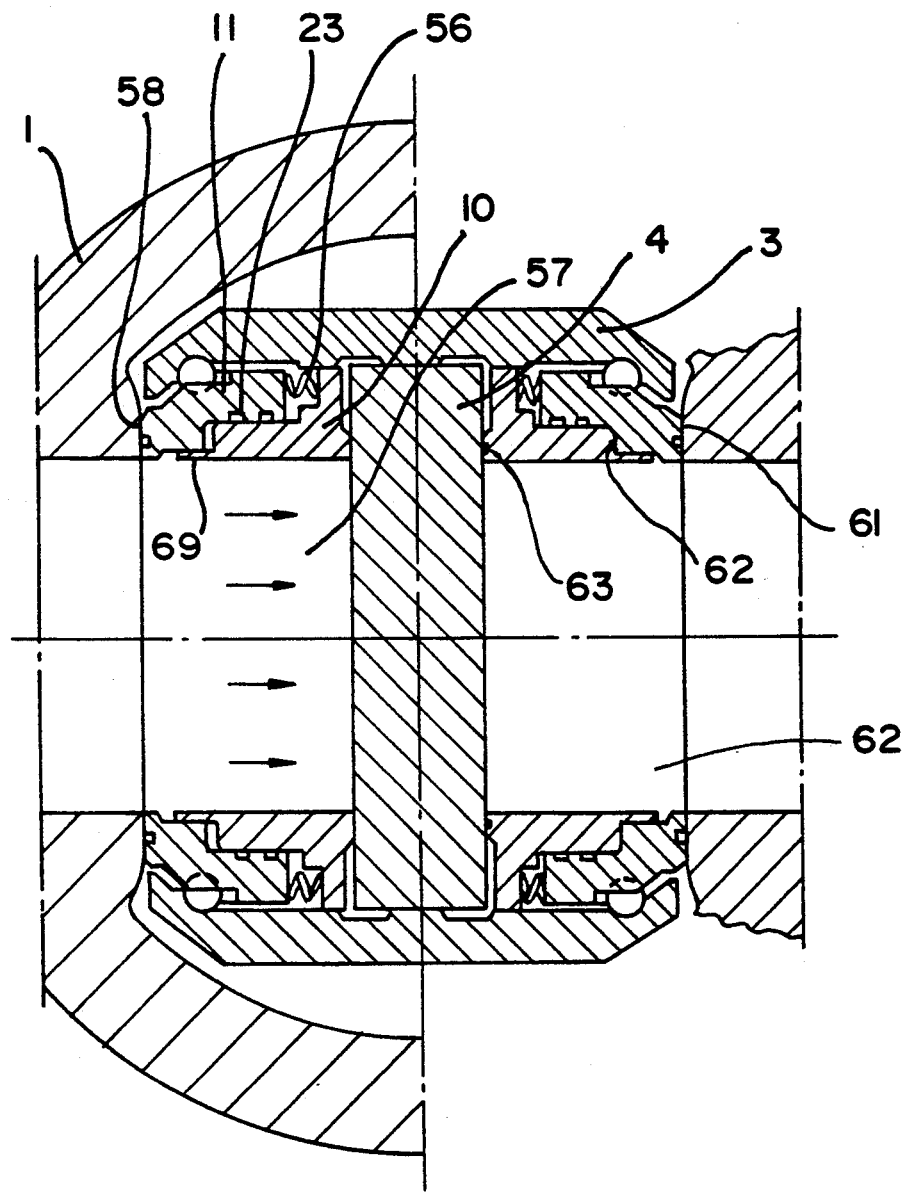
FIG. 6 shows, in a section corresponding to that of FIG. 4A, how the gaskets are biased against the valve member and the seats in the valve housing.

FIG. 6 shows a horizontal section through the center of the passage in the gate valve, whereby the valve member 4 is in its closed position. The pressure at the upstream side 57 forces the valve member and the gasket 11 against the valve housing seat 58 at the downstream side, and metallic sealing is also created between the gaskets 10 and 11 on this side, in the surface 62.

At the upstream side 57 the spring 56 biases the gaskets 10 and 11 away from each other and towards the valve member 4 and the valve housing, respectively, for metallic sealing. Sealing between the gaskets is achieved by means of an elastomer sealing ring 23. This sealing is protected against loose particles from the flow by means of a collar 69.

Figure 7:
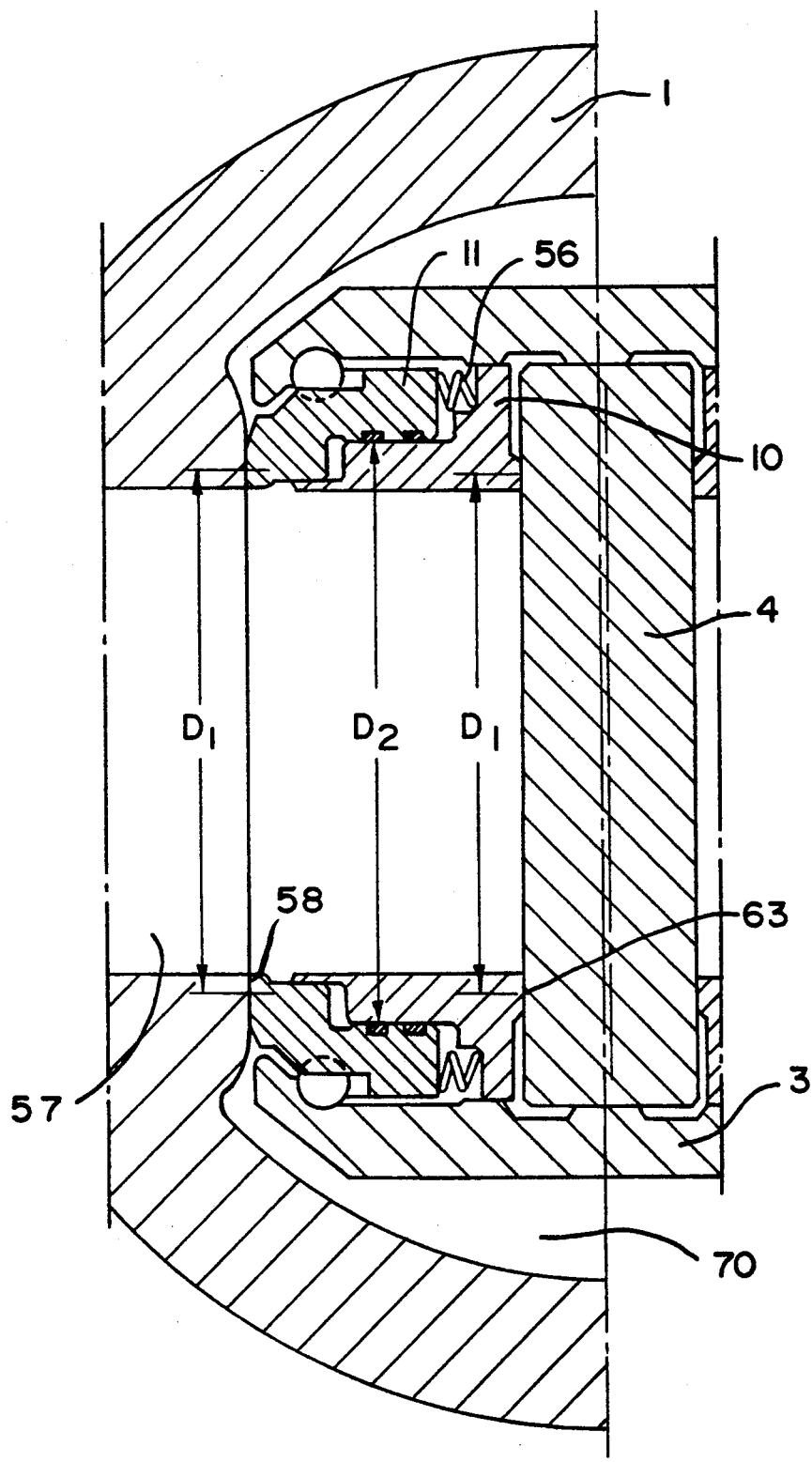
FIG. 7 shows in a larger scale a section corresponding to those of FIGS. 3 and 6 and shows the relationship between some diameters.

As it appears from FIG. 7 the sealing between the gaskets takes place at a diameter D2 which is greater than the mean sealing surface diameter D3 against the valve housing 1 and $D_1$ against the valve member 4.

Thus, the pressure in the passage will, due to the piston action caused by the diameter difference between the sealing surfaces always contribute to increase the pressure against the valve seats. Simultaneously the diameter difference between the sealing surfaces permits that elevated pressure in the valve housing chamber 70, caused for instance by movement of the valve member, can be vented to the upstream side of the valve. The sealing arrangement also has the advantage that a possible drop in the valve housing chamber 70 does not influence the pressure in the passage.

Moreover, the FIGS. 1 to 7 show the following elements which are included in the embodiment shown but which do not limit the scope of the invention:

Below the cover 2 is a gasket 12. Around the spindle 9 is a gasket 13, below a gasket retainer 14. A cover 17 around the spindle 9 keeps underlying gaskets around the spindle 9 in place.

The guide 20 below the retainer 3 is fastened by means of the bolt 18. Between the rings 10 and 11 are springs 22. Between the cover 2 and the housing 1 is a seal 24, and sealing devices 26, 28, 30 are situated between the spindle 9 and the cover. Pins 34 prevent rotation of the rings 11.

On the rings 11 are sealing surfaces 53, 61 (FIG. 3) for engagement against sealing surfaces 61 in the housing 1 (FIG. 6). The passage 55 through the valve (FIG. 3) extends through the rings 10 and 11 and the housing 1.

The housing 1 is bevelled at 60 on the inside.

The rings 10 have sealing surfaces 63 against the valve member 4.

The cover 2 is fastened to the housing 1 by means of claws 65, which are urged towards their locking position and locked by means of a coupling ring 64 adapted to be moved parallelly to the spindle 9.

Figure 8:
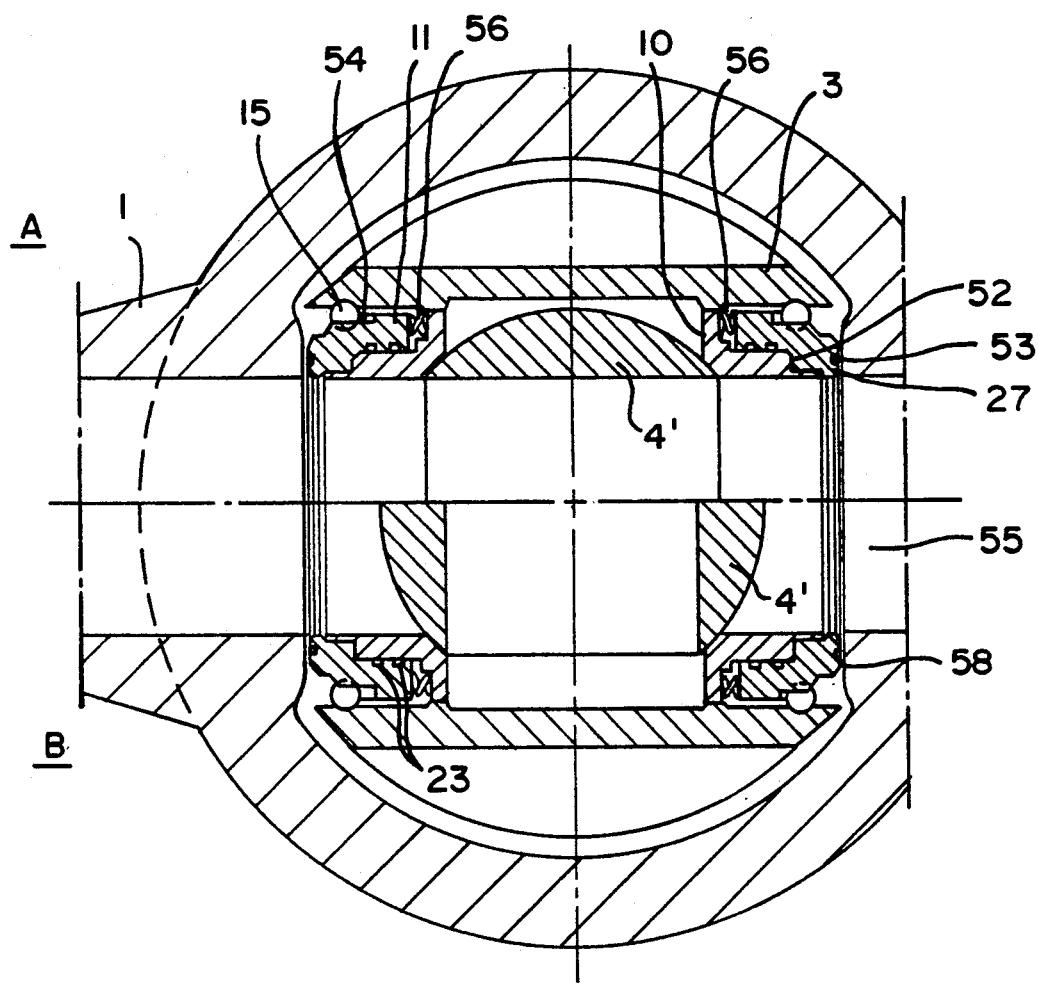
FIG. 8 shows a devise according to the invention in an application in a ball valve.

FIG. 8 shows the device utilized in a ball valve. The FIG. shows, in an axial section through the valve passage, a valve housing 1 containing a retainer 3 which is fastened to a not shown valve cover. The cover can be designed and fastened in a manner analogous to what is shown in FIG. 1. The retainer 3 contains a valve ball 4', which in the upper portion of FIG. 8 is shown in an open position and in the lower portion is shown in a closed position. The ball 4' is connected to a spindle, analogous to the spindle 9 shown in FIG. 1, but adapted for rotational movement. Two pairs of gasket rings 10 and 11 are provided, analogous to the gasket rings 10 and 11 shown in FIG. 3, the difference being that FIG. 8 shows the ball 4', against which one of the pairs of gasket rings 10 is in contact. A spring 56 urges the rings 10 and 11 away from each other. FIG. 8 shows, correspondingly to FIGS. 4 to 7, locking rods 15 for locking of the gasket rings 11 during the assembly, and reference is made to the part of the description relating to FIGS. 4 to 7. The embodiment of FIG. 8 may also comprise protrusions corresponding to the protrusions 35 shown in FIGS. 4 and 5, for axial displacement of locking rods 15, in a manner corresponding to that explained in connectionn with FIGS. 4 to 7.

In all of the embodiments the rings 10 may be made integrally with the retainer 3. In such a case the circumferential ribs shown in FIGS. 3 to 7 at each end of the retainer 3 must be omitted in order to permit axial entry of the rings 11 into the retainer 3. When the retainer is as shown in FIGS. 3 to 7 the rings 10 and 11 must be introduced in the retainer 3 through the gap where the slide 4 is to be positioned. If the rings 10 shown in FIG. 8 are made integrally with the retainer 3, the retainer 3 must be divisible in order to permit mounting of the ball 4'.

The retainer 3 shown in FIG. 8 has no such ribs, and both of the pairs of rings 10, 11 and the ball 4' can be mounted in the retainer 3 by being axially introduced therein. Thereupon the locking rods 15 are brought into place, in positions which cause that the rings 11 are held in axially innermost positions, corresponding to those shown in FIGS. 3 and 4B, whereby the rings 11 get clear of the sealing surfaces 58 in the valve housing when the retainer 3 is introduced into the valve housing.

The device according to the invention may also be utilized in combination with other types of valve members than gate sluices and balls, as for instance flaps.

I claim:

1. A valve device comprising a valve housing having inlet and outlet end pieces for mounting of the valve in a pipeline, and a valve member in the housing movable between open and closed positions for opening and closing of the valve, said valve member being mounted in an assembly which can be removed as a unit from the valve housing, said assembly comprising a cover adapted to bs fasten to the valve housing, a rod or spindle for moving the valve member between open and closed positions, a retainer in which the valve member is movable, gasket means carried by the retainer and arranged to seal both against the movable valve member and against fixed seats in the valve housing, said valve housing having a transverse opening adapted to receiver the assembly and including means for locking the cover in its mounted position and permitting rectilinear movement of the assembly into and out of the transverse opening, said gasket means being movable between retracted and extended positions towards and away from the housing seats relative to the retainer while supported on the retainer, spring means for urging said gasket means axially towards the housing seats in a sealing relationship when the valve device is assembled, locking means for temporarily locking said gasket means in a retracted position on the retainer until said valve device is assembled, said locking means comprising movable locking rods arranged to lock the gasket means in retracted positions until the valve device is assembled, said locking rods extending parallel to the direction of insertion of the retainer into the valve housing during assembly of the valve device.

2. A device as claimed in claim 1, including means in the valve housing for engaging and forcing the locking rods into gasket means releasing positions when the retainer is inserted fully into the housing.

3. A device as claimed in claim 2, including means for protecting the retainer from impact with the housing during insertion of the retainer into the valve housing.

4. A device as claimed in claim 1, each of said gasket means including at least one knob, and each locking rod including a recess for receiving said knob when each gasket is moved to its extended position.

5. A device as claimed in claim 1, wherein said gasket means comprises two gasket pairs each comprising first and second relatively movable gasket elements extending between the movable valve member and a respective valve housing seat, said first gasket element engaging the movable valve member along a valve member sealing surface having a mean diameter D1, the second gasket element engaging its respective valve housing seat along a second sealing surface having a mean diameter D3, and said first and second gasket elements fitting together in telescopic relationship along a cylindrical sealing surface having a diameter D2, and wherein said diameter D2 is greater than said diameter D3.

6. A device as claimed in claim 5, wherein said first gasket elements each include an outer cylindrical surface disposed within a cylindrical bore in each second gasket element.

7. A device as claimed in claim 1, wherein said gasket means comprise metallic rings.

8. A device as claimed in claim 1, wherein said gasket means include elastomer sealing rings for engaging the valve housing seats.

9. A device as claimed in claim 1, wherein said gasket means comprises two gasket pairs each comprising first and second relatively movable gasket elements extending between the movable valve member and a respective valve housing seat, the first gasket element engaging the movable valve member along a valve member sealing surface, the second gasket element engaging its respective valve housing seat along a second sealing surface, and said first and second gasket elements fitting together in telescopic relationship along a cylindrical sealing surface, and means for preventing ingress of contamination between the first and second gasket elements.

* * * * *